C. F. WALL.
NOSE GRIP FOR EYEGLASSES.
APPLICATION FILED APR. 27, 1918.

1,284,500.

Patented Nov. 12, 1918.

INVENTOR.
Charles F. Wall
BY
Cyrus N. Anderson
ATTORNEY.

UNITED STATES PATENT OFFICE.

CHARLES F. WALL, OF PHILADELPHIA, PENNSYLVANIA.

NOSE-GRIP FOR EYEGLASSES.

1,284,500.   Specification of Letters Patent.   Patented Nov. 12, 1918.

Application filed April 27, 1918. Serial No. 231,080.

*To all whom it may concern:*

Be it known that I, CHARLES F. WALL, a citizen of the United States, residing in the city of Philadelphia, county of Philadelphia, State of Pennsylvania, have invented certain new and useful Improvements in Nose-Grips for Eyeglasses, of which the following is a specification.

My invention relates to nose grips for eyeglasses, and it has for its object to provide means whereby such grips may be adjusted with greater facility and to greater advantage than heretofore has been practicable.

In the practical experience of fitting eyeglasses upon the nose, I have found that owing to the contour of the bony portion of the nose, there is always a certain amount of slippage forward. The nose grips usually come to rest when sufficient tissue is piled up in front of the forward edges of the nose grips. This provides what I regard and shall refer to as a natural resting point of the nose grips upon the nose and this natural resting point or place cannot be changed readily. Its angle with respect to a vertical plane or with respect to the front portion of the face is predetermined by the shape of the nose. The nose grips, having come to rest under the circumstances just previously stated, furnish a foundation upon which to begin the work of fitting the glasses to the wearer and any attempt to change or adjust the gripping members with respect to the positions or points at which they have come to rest usually destroys their holding power.

By my invention I have provided means whereby the several plane adjustments of the lenses of the eyeglasses may be accomplished without disturbing the bearing or position of the nose guard with respect to the points at which they have come to rest naturally on the nose.

The means employed by me for effecting these adjustments consist of nose grips having arms for supporting the same, the rear ends of which are bifurcated or forked.

Describing generally the operation of this construction of arm when employed to effect adjustments of the lenses, it may be stated that by shortening the lower part of a bifurcated arm by crimping or by increasing the curvature thereof, the lower edges of the lenses are moved closer to the face. By shortening the upper part of such bifurcation by crimping or by curving the same the upper edges of the lenses are moved closer to the face. By shortening both arms by crimping or curving the same, the lenses as a whole are moved closer to the face without changing their angular relation with respect to the face or to the plane co-incident with the plane of the lenses.

The object of my invention, therefore, may be stated broadly to be to provide an improved construction of the arm supporting the nose bearing portions of nose gripping members whereby said nose bearing portions may be readily adjusted to vary the angular relation of the same with respect to the plane of the lenses of a pair of eyeglasses; and also to vary the distance between the lenses and the face without altering their angular position.

Other objects and advantages of my invention will be particularly referred to and pointed out in the detailed description thereof which follows herein.

In order that my invention may be readily and easily understood and its practical, commercial advantages fully appreciated reference may be had to the accompanying drawing in which I have illustrated one form of a convenient embodiment of the same. It will be understood, however, that my invention is susceptible of embodiment in other forms of construction than that shown and that the same is not limited to the details as herein shown and described.

In the drawing:—

Figure 1:
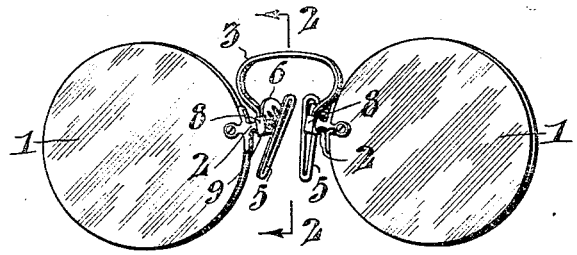
Figure 1 is a view in front elevation of a pair of glasses provided with nose grips embodying my invention.

Referring to the drawing, 1 designates the lenses of a pair of eyeglasses having the usual studs 2 which are connected by means of the usual spring bridge 3, the opposite ends of which are secured in boxes or housings upon the inner opposing ends of the studs 2. The nose grips are respectively provided with nose bearing parts 5 which are connected with the studs 2 by means of arms 6. The said arms 6 terminate at their forward ends with depending portions 7 which enter the boxes or housings 8 of the studs 2 from the top. The said arms are secured in the said boxes or housings by means of screws 9 which also secure the opposite ends of the bridge 3, which project into the said boxes or housings, to the studs 2. The rearwardly extending portions of the respective arms 6 are situated upon the outer sides of the nose bearing parts 5 and are bifurcated to form two separate, spaced, rearwardly extending parts or bifurcations 10 and 12. The rear end portions of these parts are bent inwardly as shown at 14 and 15, and are connected to the rear edges of the parts 5. In the construction as illustrated the points of connection are nearer to the upper ends of the said parts than they are to the lower ends thereof, but it will be understood that my invention is not limited by the position or positions of the points of connection between the parts 10 and 12 with the rear edges of the nose bearing parts 5.

The nose grips having been secured to the studs 2 in the manner above described and it being desired to adjust the same so as to vary their angular relation with respect to the plane of the lenses of a pair of eyeglasses such adjustment may be accomplished or effected by varying the curvature of one or the other of the bifurcations 10 and 12 or by an adjustment of both if preferred.

By increasing or diminishing the curvature of one of the parts or bifurcations 10 and 12, the position of the nose bearing parts 5 connected therewith will be changed so as to vary its angular relation to the plane of the lenses of the eyeglasses.

Figure 2:
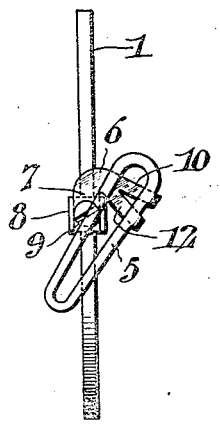
Fig. 2 is a view taken on the line 2—2 of Fig. 1, but with the spring bridge removed to prevent confusion.
Figure 4:
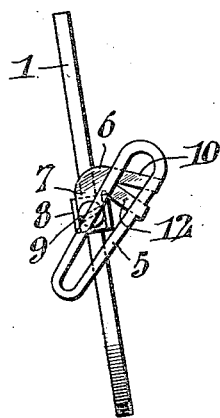
Fig. 4 is a view similar to that shown in Fig. 2, showing the nose grip in a slightly different angular position with respect to the plane of the lenses from that in which it is shown in Fig. 2.
Figure 3:
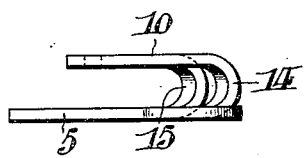
Fig. 3 is a top plan view of the nose grip shown in Fig. 2.
Figure 5:
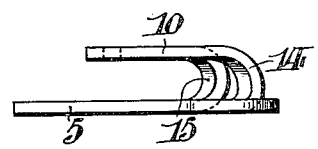
Fig. 5 is a top plan view of the nose grip shown in Fig. 4.

Comparing Figs. 2 and 3 with Figs. 4 and 5, it will be observed that the part or bifurcation 10 is shown as having been so adjusted in Figs. 4 and 5 as to cause an increase in the angle between the longitudinal plane of the part 5 and the plane of the lenses 1. This has been accomplished by partially straightening out the said part or bifurcation 10, as is apparent from an inspection of Fig. 5. By thus straightening out the part 10 it is slightly lengthened so as to cause a corresponding rearward movement of the upper end of the part 5, with a corresponding forward movement of the lower end of the said part. The said part swings upon the inwardly bent portion 15 of the bifurcation 12, slightly twisting the same. This is the adjustment effected when it is desired to position the upper edge portions of the lenses farther away from the face and at the same time throw the inner edge portions thereof nearer to the face.

Figure 6:
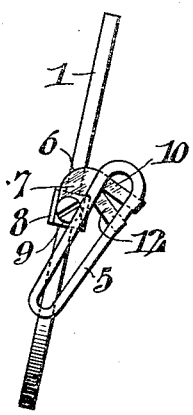
Fig. 6 is a view similar to that shown in Figs. 2 and 4 but with the nose grip in a different angular position with respect to the plane of the lenses from that in which it is shown in either Fig. 2 or Fig. 4.
Figure 7:
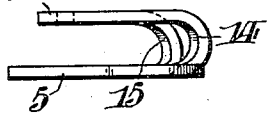
Fig. 7 is a top plan view of the nose grip shown in Fig. 6.

In Figs. 6 and 7 I have shown the nose grip occupying a position in which the angle between the longitudinal plane of the nose bearing part 5 and the plane of the lenses is less than the corresponding angles in Figs. 2 and 4. Adjustment to vary the angular relation between the said part 5 and the lenses has been effected in this instance by straightening out or lengthening the part or bifurcation 12. This is apparent by an examination of Fig. 7. By straightening out or lengthening the part 12 without adjusting the part 10 it is apparent that the lower portion of the bearing 5 will be swung rearwardly and that simultaneously the upper end portion thereof will be swung or moved forwardly about the inner end portion of the part or bifurcation 10 as a pivot.

By adjusting the parts 10 and 12 or either of them so as to cause movement of the lower end portions of the nose bearing or gripping parts 5 rearwardly and the upper portions thereof forwardly and assuming that the said parts 5 occupy the same positions upon the nose it will be apparent that the upper edge portions of the lenses will be adjusted or moved into positions nearer the face while the lower edge portions thereof will be moved or adjusted into positions farther away from the face.

It is apparent, therefore, that by causing relative adjustments between the parts 10 and 12, shortening the one or the other or adjusting both as may be desired, the angular positions of the nose bearing or gripping parts 5 with respect to the plane of the lenses of a pair of eyeglasses may be varied to thereby vary the position of the lenses with respect to the eyes of the wearer, provided the bearing parts 5 are placed in the same positions upon the nose of the wearer.

I claim:—

1. A nose grip for eyeglasses comprising a nose bearing member and an arm for supporting the same, said arm being bifurcated at its rear end and the bifurcations thereof being connected to the rear edge of said nose gripping member.

2. In eyeglasses, the combination of the lenses, housings secured to the inner edges of said lenses, nose gripping members having arms, the forward ends of which are extended downwardly into and are secured to the said housings, the rear end portions of said arms being divided into two parts which extend rearwardly and the rear ends of which are bent inwardly and connected to the rear edges of the said nose gripping members.

3. A nose grip for eyeglasses comprising a nose bearing member and an arm for supporting and connecting the said nose bearing member with the lenses of a pair of eyeglasses, the rear portion of said arm being bifurcated and divergent and the ends of the bifurcated parts having connection with the rear edge of the said nose bearing member.

4. A nose grip for eyeglasses comprising a nose bearing member and an arm having connection with the said eyeglasses and with the said nose bearing member for supporting the latter, the rearwardly extending portion of said arm being divided into two diverging parts, the rear ends of which are bent inwardly and are connected to the rear edge of the said nose bearing part, the points of connection being separated a distance from each other.

5. In eyeglasses, the combination of the lenses, nose bearing members and connections between the said lenses and the said nose bearing members, said connections comprising arms, the rear end portions of which are divided into two parts which extend rearwardly in diverging relation with respect to each other and the rear ends of which parts are bent inwardly and are connected to the rear edges of the respective nose bearing members, substantially as described.

6. In eyeglasses, the combination of the lenses, studs having connection with the lenses, which studs are provided upon their inner ends with housings, nose gripping members having arms, the forward ends of which are extended downwardly into the said housings, means for securing the forward ends of said arms in said housings, the rear end portions of said arms being divided into two parts which extend rearwardly in diverging relation with respect to each other, the rear ends of said divided parts being bent inwardly and connected to the rear edges of the said nose gripping members, substantially as described.

7. A nose grip for eyeglasses comprising an arm, the rear end portion of which is divided into two diverging parts, the rear end portions of which are bent inwardly and forwardly and are connected to the rear edge portion of the nose bearing member of said nose grip, the points of connection being spaced a distance from each other and the said points of connection being situated above the center of the length of the said nose gripping member.

In testimony that I claim the foregoing as my invention, I have hereunto signed my name this 26th day of April, A. D. 1918.

CHARLES F. WALL.